United States Patent

[11] 3,602,415

[72] Inventor William J. Gross
Woodland Hills, Calif.
[21] Appl. No. 878,633
[22] Filed Nov. 21, 1969
[45] Patented Aug. 31, 1971
[73] Assignee Data Instruments Company
Sepulveda, Calif.

[54] INDEXING MECHANISM FOR A MAGNETIC TAPE TRANSPORT
10 Claims, 3 Drawing Figs.

[52] U.S. Cl. .......... 226/188, 226/194, 192/66, 192/84
[51] Int. Cl. .......... G11b 15/24
[50] Field of Search .......... 226/194, 188, 152, 37, 178; 192/14, 66, 84

[56] References Cited

UNITED STATES PATENTS

| | | | |
|---|---|---|---|
| 3,116,000 | 12/1963 | Wales, Jr. | 226/188 X |
| 3,124,291 | 3/1964 | Beer | 226/178 |
| 3,154,233 | 10/1964 | Hubbard et al. | 226/37 X |
| 3,361,236 | 1/1968 | Wreusch | 192/84 X |
| 3,385,497 | 5/1968 | Taraborrelli | 226/188 |
| 3,428,233 | 2/1969 | Hokkinen | 226/188 X |

*Primary Examiner*—Allen N. Knowles
*Attorney*—Spensley and Horn

ABSTRACT: An indexing mechanism for incrementally advancing or indexing a magnetic tape particularly adaptable for use with a standard magnetic tape transport or recorder is disclosed. A flywheel having a relatively large rotating inertia when compared to the inertia required to drive a tape capstan is rotated at a constant speed freely about a shaft coupled to the tape capstan. A clutch mechanism controlled by a solenoid causes the shaft to engage the flywheel, thus causing the tape to quickly accelerate and be driven. The capstan and its associated shaft has a relatively low moment of inertia and rapidly decelerates when disengaged from the flywheel due to the friction of the tape motion and other portions of the tape drive.

PATENTED AUG 31 1971 3,602,415

WILLIAM J. GROSS
INVENTOR.

BY Spensley & Horn
ATTORNEYS

INDEXING MECHANISM FOR A MAGNETIC TAPE TRANSPORT

BACKGROUND OF THE INVENTION

1. Field of the Invention

The invention relates to mechanism for incrementing or indexing magnetic tapes.

2. Prior Art

Magnetic tape recording devices have been widely used in numerous fields including the field of data processing. It is often desirable in many applications to cause a magnetic tape to incrementally move across a recording or reading head. This is particularly desirable when relatively large time intervals elapse between the generation of each portion of the information which is to be recorded. In such applications, an apparatus is required to rapidly accelerate the magnetic tape to a predetermined speed and to also rapidly decelerate the tape so that a minimum of tape is utilized in recording the information.

Numerous indexing mechanisms are commercially available for indexing or incrementing a magnetic tape. Many of these mechanisms utilize expensive electrical motors which provide the rapid acceleration and deceleration. Some of these mechanisms are not economically feasible or adaptable for use in converting a standard audio tape recorder to digital use and require a more complex tape transport system.

SUMMARY OF THE INVENTION

An indexing mechanism for incrementally moving a magnetic tape, particularly suitable for use with a standard or continuous audio magnetic tape transport or tape recorder is described. The tape driving capstan which comprises an elongated shaft contains a facing plate at the end of the shaft opposite the capstan. A flywheel having a relatively large moment of inertia is driven at a constant speed freely about the shaft. A pressure plate driven by the flywheel, which contains a clutch disc, is coupled to the flywheel such that the facing plate is disposed between the pressure plate and flywheel. A solenoid actuated lever arm urges the pressure plate towards the facing plate, thereby causing the capstan to rotate with the flywheel. Because of the large moment of inertia of the flywheel, the capstan and the magnetic tape which it drives are rapidly accelerated when the pressure plate engages the facing plate. The capstan shaft and facing plate which have a low moment of inertia rapidly decelerate when the pressure plate disengages the facing plate, due to frictions associated with the tape movement such as bearing friction in the tape reels and capstan.

It is an object of the present invention to provide an indexing mechanism for a magnetic tape transport which provides a rapid acceleration and deceleration for the magnetic tape in the transport.

It is still a further object of the present invention to provide an indexing mechanism for advancing a tape which is inexpensive and is readily adaptable for use with a tape recorder which utilizes a capstan to drive the magnetic tape.

It is still another object of the present invention to provide an indexing mechanism which moves a magnetic tape for a precise short distance.

It is still another object of the present invention to provide an indexing mechanism which is adaptable for converting a standard continuous audio tape recorder.

DETAILED DESCRIPTION OF THE INVENTION

Figure 1:
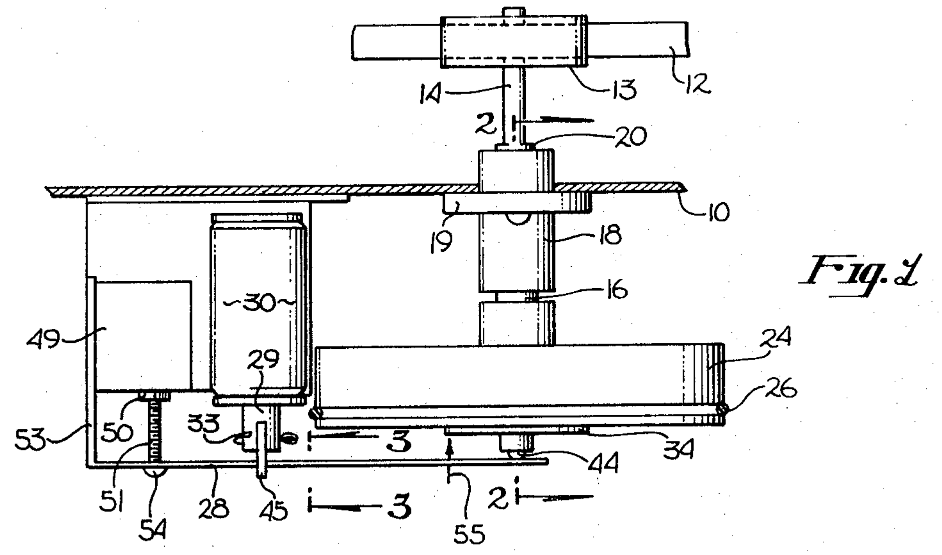
FIG. 1 illustrates the indexing mechanism coupled to a tape deck wherein the capstan is engaging a magnetic tape.

Referring to FIG. 1, the indexing mechanism is illustrated coupled to a tape deck 10. In the present invention the indexing mechanism is readily adaptable for being utilized with a standard tape drive capstan 14, which is illustrated engaging a magnetic tape 12 and an idler wheel 13. In many tape transport devices, the idler wheel, typically a rubber wheel, is freely rotatable and is brought in contact with the capstan and magnetic tape when the tape is to be driven. While the present invention is illustrated with a standard capstan 14, the indexing mechanism may also be utilized with other tape drives by coupling capstan 14 or shaft 16 to the tape drive.

Figure 2:
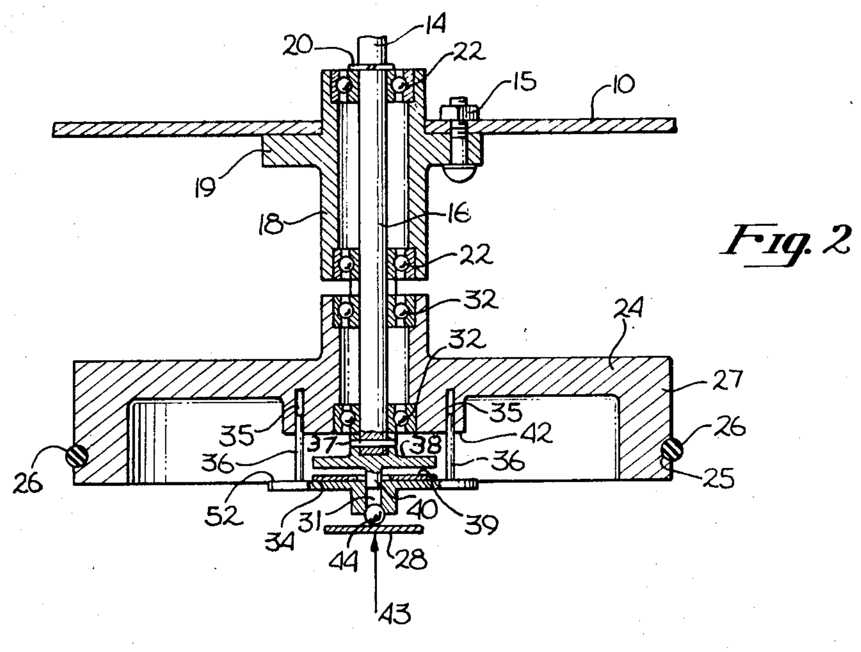
FIG. 2 is a partial cross-sectional view of the mechanism of FIG. 1 taken through section line 2—2 of FIG. 1.

Referring to FIGS. 1 and 2, the capstan shaft 16 which defines capstan 14 at one end is disposed perpendicular to tape deck 10 and held in position by sleeve 18. Sleeve 18, an elongated cylindrical member, contains an annular support 19 which is bolted to tape deck 10 by means of bolts, one of which, bolt 15, is illustrated in FIG. 2. Bearings 22, disposed at opposite ends of the sleeve 18, allow the shaft 16 to rotate freely within sleeve 18. A lock ring 20, which is coupled to capstan 14, freely rotates with the inner race of bearing 22, adjacent to capstan 14, and prevents the shaft from moving vertically downward. A circular facing plate 38 is axially disposed about the other end of shaft 16 and rigidly coupled to the shaft by means of pin 37. A guide pin 40, which comprises a cylindrical member is rigidly coupled to plate 38 along the axis of shafts 16 and plate 38. The surface of facing plate 38 opposite shaft 16 is a relatively smooth, flat surface perpendicular to the axis of shaft 16 and adaptable for engaging a clutch disc. Shaft 16, including capstan 14, sleeve 18, bearings 22, facing plate 38, and pin 37 may be ordinary metal parts fabricated using commonly known techniques.

A flywheel 24 is disposed axially about shaft 16 and rotates freely about the shaft on bearings 32. One end of the flywheel 24 is adjacent to the facing plate 38. A plurality of bores 35 are disposed circumferentially about the surface 42 of flywheel 24. Bores 35 are disposed parallel to the axis of shaft 16 and are adaptable for receiving pins 36 of pressure plate 34. The flywheel 24 contains a concave recess 25 disposed about its periphery, the recess is adaptable for cooperatively engaging belt 26. Belt 26 is coupled to an electric motor not illustrated. The electric motor which may be an ordinary synchronous or induction motor is coupled to the belt 26 and is adaptable for driving the flywheel 24 at a predetermined, substantially constant rate of rotation and for also driving capstan 14 when the shaft 16 is coupled to the flywheel 24. This predetermined rate of rotation is approximately equal to the rate of rotation required in order for capstan 14 to cooperatively drive magnetic tape 12. The outer periphery of flywheel 24 contains a rim 27 which increases the moment of inertia of the flywheel 24. The moment of inertia of the flywheel 24 should be great enough so that the energy associated with its rotation at its predetermined rate of rotation is significantly greater than the energy required to accelerate shaft 16 and tape 12 to the same predetermined rate of rotation. Flywheel 24 and bearings 32 may be ordinary metal parts.

A circular pressure plate 34 having an axially disposed guide slot 31 adaptable for cooperatively engaging guide pin 40 is disposed below facing plate 38. A plurality of drive pins 36 are circumferentially disposed vertically above surface 52 of pressure plate 34. The drive pins 36 are adaptable for cooperatively engaging bores 35 of flywheel 24. Thus, the pressure plate 34 is able to move toward and away from facing plate 38 along the axis of shaft 16. Guide pin 40 and the drive pins 36 force the pressure plate 34 to remain parallel to facing plate 38 when the pressure plate is urged toward or moved away from the facing plate 38. In addition, since the drive pins 36 are rigidly coupled to the pressure plate 34 and disposed within bores 35, pressure plate 34 rotates along with flywheel 24. The pressure plate including the drive pins 36, may be ordinary metal parts.

A clutch disc 39 is rigidly coupled to surface 52 of pressure plate 34. The clutch disc may be made from any material which is suitable for acting as a clutch material between the pressure plate 34 and the facing plate 38. Any one of numerous commonly known materials may be utilized, including cork. A contact ball 44 is rigidly coupled to the center of pressure plate 34, opposite surface 52. Ball 44 may be made from any material which is adaptable for acting as a bearing surface or point. For example, ball 44 may be a Teflon or plastic member glued to pressure plate 34. Note that the pressure plate 34 is held in the position shown in FIG. 2 by lever arm 28.

Figure 3:
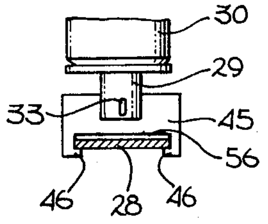
FIG. 3 is a sectional view illustrating the coupling between the solenoid and lever arm taken through section line 3—3 of FIG. 1.

Referring to FIGS. 1 and 3, lever arm 28, an elongated metal strip , is disposed between ball 44 of pressure plate 34 and support arm 53. Support arm 53 which is rigidly coupled to tape deck 10, provides support for the end of the lever arm 28 opposite ball 44. A bolt 51 which is coupled to a support block 49, freely passes through an aperture disposed through the lever arm 28. The support block 49 is threaded to cooperatively receive bolt 51. The lever arm 28 rests on the head 54 of bolt 51. A nut 50 is tightened against block 49 and prevents bolt 51 from disengaging support block 49.

A solenoid 30 which may be an ordinary electrical solenoid, is rigidly coupled to tape deck 10. The plunger 29 of the solenoid is normally extended from the solenoid body and is drawn into the solenoid when electrical current is applied to the solenoid. The plunger 29 of a solenoid 30, is coupled to holder 45 by means of cotter pin 33 (FIG. 3). The holder 45 is a generally rectangular member having a channel 56 adaptable for engaging lever arm 28. Lips 46 which are disposed at opposite ends of the channel 56, cause lever arm 28 to remain within the channel 56. Thus, as the plunger 29 of solenoid 30 moves, the lever arm 28 must also move.

Referring to FIGS. 1 through 3, the operation of the indexing mechanism may be readily understood. As solenoid 30 is actuated, the lever arm 28 moves as indicated by arrow 55 of FIG. 1 and arrow 43 of FIG. 2. When the solenoid 30 is not actuated, the lever arm 28 and pressure plate 34 are in the position indicated in FIG. 2. When it is required to index or increment tape 12, the solenoid 30 is electrically actuated, causing the plunger 29 to be drawn into the solenoid. As this occurs, the lever arm 28 moves in the direction indicated by arrow 55 of FIG. 1 and arrow 43 of FIG. 2 and urges the pressure plate 34 towards engagement with facing plate 38. When the pressure plate 34 engages the facing plate 38, shaft 16 is forced to rotate with flywheel 24 and hence the capstan 14 drives tape 12. When the electrical current is removed from solenoid 30, the plunger 29 moves out of the solenoid, thus causing the lever arm 28 to move away from the ball 44 of pressure plate 34. Since the pressure plate 34 is disposed beneath the flywheel 24, the force of gravity causes the pressure plate 34 to move away from the facing plate 38 and disengage the facing plate 38. A spring not shown may be added between the flywheel 24 and the pressure plate 34 to cause the pressure plate 34 to more quickly disengage the facing plate 38. These springs, for example, may be disposed along the drive pins 36. The friction associated with the magnetic tape and its movement in the tape recorder and cassette causes the shaft 16 and capstan 14 to decelerate and stop rotating. For example, the friction in the bearings of the tape reels shaft 16 and idler wheel 13 assist in deceleration of the capstan. Note that the bolt 51 of FIG. 1 may be adjusted within support block 49 and hence, be utilized to define and limit the travel of lever arm 28.

Since the energy associated with the rotation of flywheel 24 at its predetermined rate of rotation is considerably greater that the energy required to accelerate the shaft 16 and tape 12, the tape 12 is quickly accelerated when the pressure plate 34 engages the facing plate 38. In addition, since the shaft 16 may be a relatively thin shaft, and since facing plate 38 has a relatively low moment of inertia, very little energy is associated with the rotation of these members. Thus, when the pressure plate 34 disengages the facing plate 38, the shaft does not continue to drive the tape 12 and the friction associated with the movement of the tape 12 readily decelerates the shaft 16 and capstan 14.

It should be noted that the presently disclosed indexing mechanism may be readily adapted for use on a standard, high production, tape recorder or tape transport system. The entire mechanism may be built from ordinary parts and does not require the use of high precision parts. Because of the relative amount of inertia of the capstan and its shaft, and the flywheel, the mechanism provides fast acceleration of a magnetic tape and quick deceleration.

I claim:

1. An indexing mechanism for a magnetic tape transport comprising:

a shaft coupled at one end to a tape driving mechanism;

a flywheel disposed about the shaft, said flywheel being freely rotatable on said shaft;

a driving means for causing said flywheel to rotate, coupled to said flywheel;

a facing surface perpendicular to and rotatable with said shaft;

a pressure plate movably mounted to said flywheel and rotatable with said flywheel, comprising a plate axially mounted with said flywheel and including a plurality of pins movable within said flywheel and rigidly coupled to said plate, said pressure plate being adaptable for moving toward said facing surface and engaging said facing surface thereby causing said shaft to rotate with said flywheel; and contact mechanism for causing said pressure plate to engage said surface.

2. The indexing mechanism defined in claim 1 wherein said one end of said shaft is a capstan for engaging and driving a magnetic tape.

3. The indexing mechanism defined in claim 2 wherein said driving means comprises an electric motor coupled to said flywheel for driving said flywheel at a substantially constant rate of rotation.

4. The indexing mechanism defined in claim 3 wherein the energy defined by the rotating inertia of said flywheel at said predetermined rate of rotation is substantially greater than the energy required to accelerate said capstan including any magnetic tape engaging said capstan, to said predetermined rate of rotation.

5. The indexing mechanism defined in claim 1 wherein said facing surface comprises a facing plate rigidly mounted at the other end of said shaft between said pressure plate and flywheel and where said pins connecting said flywheel and pressure plate are disposed such that said facing plate may freely turn within said pins.

6. The indexing mechanism defined in claim 1 wherein said contact mechanism comprises a solenoid operated lever arm.

7. The indexing mechanism defined in claim 6 wherein a clutch disc adaptable for engaging said facing plate is coupled to said pressure plate.

8. The indexing mechanism defined in claim 7 wherein a ball-shaped bearing surface is rigidly coupled to said pressure plate opposite the surface containing said clutch disc and said lever arm is brought in contact with said ball thereby moving said pressure plate toward said facing plate.

9. The indexing mechanism defined in claim 8 wherein said shaft is vertically mounted to a tape deck such that the force of gravity tends to urge said pressure plate away from said facing plate.

10. The indexing mechanism defined in claim 9 wherein the energy defined by the rotating inertia of said shaft and facing plate is low when compared to the energy required to drive the magnetic tape, thus causing the magnetic tape to rapidly decelerate when said pressure plate disengages said facing plate.